Feb. 7, 1950     E. A. FARR ET AL     2,496,705

WAFFLE IRON

Filed Feb. 26, 1947

INVENTORS
EDWARD A. FARR and
JOHN P. THEISEN,
BY
ATTORNEYS.

Patented Feb. 7, 1950

2,496,705

UNITED STATES PATENT OFFICE 2,496,705

WAFFLE IRON

Edward A. Farr and John P. Theisen, Columbus, Ind., assignors to Noblitt-Sparks Industries, Inc., Columbus, Ind., a corporation of Indiana Application February 26, 1947, Serial No. 730,944

3 Claims. (Cl. 99—372)

The co-pending application of Edward A. Farr, Serial No. 681,406, filed July 3, 1946, discloses an electric cooking appliance comprising two hingedly connected grills with each of which there is removably associated a waffle grid. Heat for cooking is supplied by electrical resistance heating elements respectively associated with the grills which, with the waffle grids removed, can be employed in the performance of a variety of cooking operations. When the waffle grids are in place, they fit in heat-conducting relationship against the grills, and the device may then be used as a waffle iron.

The present invention is directed to a cooking appliance of the type just described and has for its object the provision of releasable means for holding the waffle grids in association with the grills. A further object of the invention is to produce a grid-holding means which can be simply and economically manufactured and installed, which can be easily operated either to hold the associated waffle grid in place or to release it for removal from the cooking appliance, and which will operate to hold the grid in firm heat-conducting relationship with its associated grill.

In carrying out our invention, each of the grills is provided with an outwardly extending flange, and each of the waffle grids is provided with an arm which projects outwardly beyond such flange. A retaining element pivoted on the outer end of such arm embodies a cam surface which, by swinging the retaining element, can be brought into engagement with the flange on the grill, to hold the grid and grill firmly clamped together, or released from engagement with the flange, to permit removal of the grill.

The accompanying drawing illustrates our invention: Fig. 1 is a plan view of an electric cooking appliance with the waffle grids in place and the appliance open; Fig. 2 is a front elevation of the cooking appliance in closed condition; Fig. 3 is a fragmental elevation on an enlarged scale in partial section on the line 3—3 of Fig. 4; Fig. 4 is a fragmental plan view of the upper grill showing the retaining element in operative position; Fig. 5 is a view similar to Fig. 4 illustrating the retaining element released; and Fig. 6 is a fragmental section on the line 6—6 of Fig. 3.

The cooking appliance illustrated in the drawing comprises upper and lower casing-sections 10 and 11 interconnected by any convenient form of expansible hinge 13. Mounted in the open lower end of the upper casing-section 10 is a grill 14, while a similar grill 15 is mounted in the open upper end of the lower casing-section 11. Heat for cooking operations to be performed on opposed faces of the grills 14 and 15 is derived from electrical resistance heating elements 16 mounted above the upper grill and below the lower grill. Upper and lower waffle grids 17 and 18 are removably associated with the grills 14 and 15 and are arranged to be disposed in effective heat-transmitting relationship therewith whereby heat from the heating elements 16, conducted to the grids 17 and 18 through the grills 14 and 15, may be employed for the baking of waffles.

For the purpose of holding the upper waffle grid 17 in association with the upper grill 14, it is provided on opposite sides with outwardly projecting arms 20. Conveniently, each of such arms is formed as a strip of sheet metal seated in a groove in the outer face of the waffle grid and secured in such groove as by means of a screw 21. Each of the arms 20 projects outwardly beyond the adjacent side of the grill 14 and is there provided with an opening for the reception of a pivot pin or bolt 22 through the medium of which a clip 23 is pivotally mounted on the arm 20. Desirably, the clip 23 is of a general U-shape embracing the arm 20, with the pivot pin 22 extending through parallel legs of the U and with such legs being spaced apart a distance materially greater than the thickness of the arm 20. A compression spring 24 surrounding the pivot pin 22 acts between the arm 20 and the clip 23 to urge the latter downwardly and hold the upper leg thereof in contact with the arm 20. The upper leg of the clip 23 is provided with an extension 25 adapted to engage above a flange 26 which is formed on the upper grill 14 and which projects outwardly beyond the side wall of the upper casing-section 10.

The clip 23 may be swung between a position, illustrated in Fig. 4, in which the extension 25 engages the upper surface of the flange 26, and a position, such as that illustrated in Fig. 5, in which the extension is free from engagement with such flange. When in the former position, the clip operates to hold the grid 17 firmly in association with the grill 14, but when the clip is swung to clear the flange the waffle grid may be readily removed. Desirably, the lower surface of the extension 25 is made convex downwardly, as indicated in Fig. 6, to act as a cam and to facilitate its engagement with the flange 26. The spring 24 compensates for manufacturing variations, the construction being such that the spring 24 will be stressed somewhat when the clip is engaged.

Clip-supporting arms 20' and clips 23' may be provided on the lower grid 18 for co-operation with a flange 27 on the lower grill 15. When clips are used on both the upper and lower waffle grids, they are desirably located in different vertical planes so as to avoid interference between the clips on the upper grid and the clips on the lower grid when the device is closed, as indicated in Figs. 2 and 3. As shown, the clips 23' on the lower grid are located on the front and rear edges thereof, while the clips 23 on the upper grids are located on the side edges thereof; but it will be understood that other arrangements avoiding interference are possible.

We claim as our invention:

1. In a cooking appliance, a grill having a cooking surface, means for heating said grill, a waffle grid adapted to be seated on and in heat-transmitting relationship with said grill, and means for holding said grid in place on said grill, said means comprising a flange on the grill, an arm secured to said grid and projecting outwardly beyond said flange, and a latch member pivotally mounted on said arm on an axis perpendicular to the plane of said grid and swingable into and out of grid-retaining engagement with said flange.

2. In a cooking appliance, a grill having a cooking surface, means for heating said grill, a waffle grid adapted to be seated on and in heat-transmitting relationship with said grill, and means for holding said grid in place on said grill, said means comprising an abutment on the grill, an arm secured to said grid and projecting outwardly therefrom, a latch member pivotally mounted on said arm and swingable into and out of grid-retaining engagement with said abutment, and a spring acting between said arm and latch to urge the grid toward the grill when the latch is engaged, said latch having a convex abutment-engaging surface.

3. In a cooking appliance, a grill having a cooking surface, means for heating said grill, a waffle grid adapted to be seated on and in heat-transmitting relationship with said grill, and means for holding said grid in place on said grill, said means comprising an abutment on the grill, an arm secured to said grid and projecting outwardly therefrom, and a latch member pivotally mounted on said arm on an axis perpendicular to the plane of said grid and swingable into and out of grid-retaining engagement with said abutment.

EDWARD A. FARR.
JOHN P. THEISEN.

REFERENCES CITED

The following references are of record in the file of this patent:

UNITED STATES PATENTS

| Number | Name | Date |
|--------|------|------|
| 1,214,486 | Wright | Jan. 30, 1917 |
| 1,900,619 | Snyder | Mar. 7, 1933 |